United States Patent [19]
Joncour et al.

[11] Patent Number: 5,946,074
[45] Date of Patent: Aug. 31, 1999

[54] APPARATUS FOR CENTERING A SPECTACLES LENS AND POSITIONING A GRIPPING MEMBER THEREON

[75] Inventors: Christian Joncour, Saint-Maurice; Christian Massart, Clichy-Sous-Bois, both of France

[73] Assignee: Essilor International Compagnie Generale d'Optique, Le Pont, France

[21] Appl. No.: 09/029,834

[22] PCT Filed: Dec. 3, 1996

[86] PCT No.: PCT/FR96/01916

§ 371 Date: Mar. 9, 1998

§ 102(e) Date: Mar. 9, 1998

[87] PCT Pub. No.: WO97/21140

PCT Pub. Date: Jun. 12, 1997

[30] Foreign Application Priority Data

Dec. 7, 1995 [FR] France ................................. 95 14498

[51] Int. Cl.⁶ .............................................................. A61B 3/14
[52] U.S. Cl. ................................................................ 351/208
[58] Field of Search ........................................ 351/205, 206, 351/208; 348/78; 345/435; 382/282

[56] References Cited

U.S. PATENT DOCUMENTS

| | | | |
|---|---|---|---|
| 4,730,260 | 3/1988 | Mori et al. | 345/435 |
| 4,845,641 | 7/1989 | Ninomiya et al. | 345/435 |
| 4,852,184 | 7/1989 | Tamura et al. | 382/282 |

FOREIGN PATENT DOCUMENTS

| | | |
|---|---|---|
| 1493482 | 7/1967 | France . |
| 2220803 | 10/1974 | France . |
| 2558714 | 8/1985 | France . |
| 2607268 | 5/1988 | France . |
| 2650679 | 2/1991 | France . |
| 2663528 | 12/1991 | France . |
| 38 29 488 | 3/1990 | Germany . |

*Primary Examiner*—George Manuel
*Attorney, Agent, or Firm*—Young & Thompson

[57] ABSTRACT

An apparatus comprising a plate for receiving a spectacles lens to be fitted in one of the rims of a spectacles frame selected by a patient, a positioning device arranged above the plate for positioning a gripping member on the spectacles lens, and a screen for displaying an image of the rim in which the lens is to be fitted. The apparatus is combined with imaging means so that the image is imported from the patient wearing the appropriate spectacle frame.

9 Claims, 3 Drawing Sheets

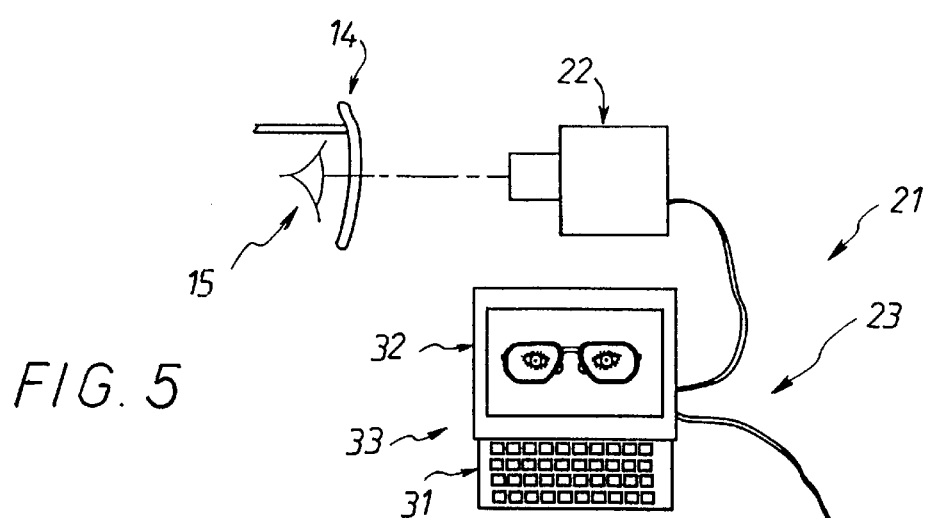
FIG. 5
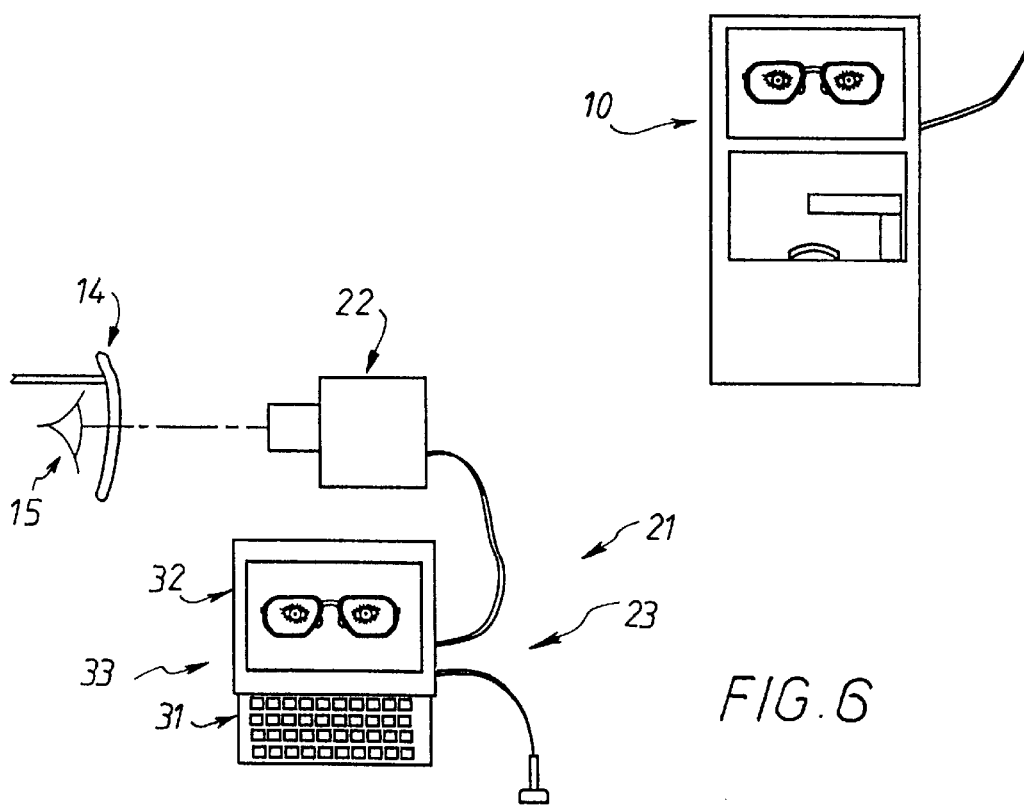
FIG. 6
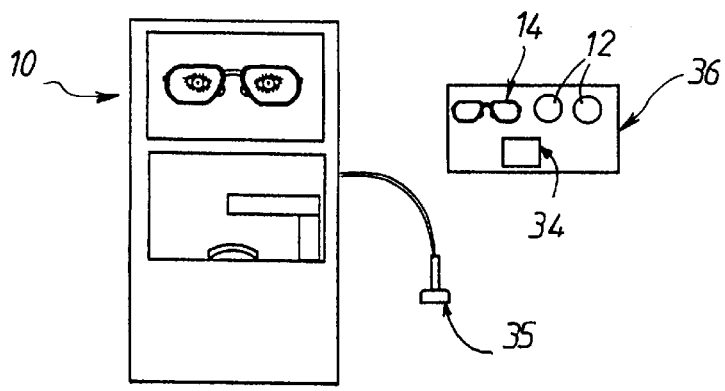

APPARATUS FOR CENTERING A SPECTACLES LENS AND POSITIONING A GRIPPING MEMBER THEREON

The present invention concerns the operations that a practitioner must execute prior to the machining that it is necessary to apply to a spectacles lens to match the contour of the latter to that of one of the rims or surrounds of the spectacles frame chosen by a patient.

In particular, it is important to center the spectacles lens relative to the rim or surround of the spectacles frame to which the lens is to be fitted and to apply to it a member referred to hereinafter for convenience only as a gripping member suitable for fitting it afterwards into a grinding machine.

These operations are usually carried out by means of the same apparatus, commonly called a centeringpositioning device, including a plate for receiving the spectacles lens to be processed and a positioning device arranged above the plate for positioning a gripping member on the spectacles lens.

For the gripping member to be positioned correctly the spectacles lens must first be "centered".

In other words, it must be positioned correctly relative to the spectacles frame rim or surround to which the lens is to be fitted.

To this end there is usually provided a screen for displaying an image of the spectacles lens and an image of the spectacles frame rim or surround to which the lens is to be fitted.

This is the case in the French patent published under the number 2 188 182, for example.

In the above French patent the screen is merely a piece of frosted grass which serves as a plate for the spectacles lens and on which is superposed by projection an image of the spectacles frame rim or surround to which the lens is to be fitted.

Providing an electronic screen on which an image of the spectacles lens and an image of the rim or surround of the spectacles frame to which the lens is to be fitted can be superposed is known in itself, in particular from the French patent published under the number 2 547 930.

In all cases the characteristics of the patient must be taken into account.

To be more precise, these are their pupillary distance, or half this distance, and the height of their pupils relative to the bottom of the spectacles frame rims or surrounds when the frame is being worn, commonly known as the mounting height.

This pupillary distance and this mounting height have for many years been measured using particular devices, namely a pupillometer for the pupillary distance and a ruler for the mounting height, and these devices are still frequently used today.

The corresponding measurements must therefore be "entered" into the centering-positioning device, with the attendant risk of error in the necessary manipulations.

It has therefore previously been proposed to make direct use in a centering-positioning device of the above kind of a photograph of the patient wearing the spectacles frame they have chosen and to measure the pupillary distance and the mounting height required from this photograph.

However, for obvious practical reason, the photograph cannot be life size and a formatting problem arises, which can itself lead to errors.

This problem is accentuated in that there is in practise no frame of reference for interpreting the photograph.

It has recently been proposed, in the French utility application published under the number 2 690 834 and in the French patent application published under the number 2 690 832 concerning the same subject matter, to computerize the measurement of the characteristics of a patient using an image of the latter provided by any kind of imaging device and in which the patient is shown wearing the spectacles frame in question, so that each of the spectacles lenses to be fitted can be centered relative to the rims or surrounds of the frame by calculation.

However, neither the above utility certificate application nor the above patent application provides any connection to a positioning device, i.e. to a device for positioning a gripping member.

A general object of the present invention is to provide an arrangement which, by virtue of a connection of the above kind, provides a satisfactory solution to the problems previously explained.

To be more precise, it consists in an apparatus for centering a spectacles lens and positioning thereon a gripping member, in other words a centering-positioning device, characterized in that it includes, in combination, a plate for receiving a spectacles lens to be fitted in one of the rims or surrounds of a spectacles frame chosen by a patient, a positioning device arranged above the plate for positioning a gripping member on the spectacles lens, and a screen for displaying an image of the spectacles lens, such as, for example, the contour of the spectacles lens itself, a reticle representative of this contour, or other types of reticle, and an image of the spectacles frame rim or surround to which the lens is to be fitted, and in that it is combined with imaging means so that the image of the spectacles frame rim or surround to which the lens is to be fitted is an image imported from the patient wearing the spectacles frame concerned.

The invention assures the importation of an image of the patient wearing the chosen spectacles frame into the centering-positioning device, from any imaging device, for example a still camera, a video camera or a camcorder, via appropriate transmission means, and this image, which can be a direct analog or digital image or a "scanned" image, i.e. an image produced by systematic point by point scanning of a pre-established image, is imported in a raw state with no known reference system and no particular processing.

In accordance with a preferred feature of the invention, the centering-positioning device is preferably coupled to a contour reading device adapted to read off the shape of the bottom of the bezel of the spectacles frame rim or surround to which the lens is to be fitted and which therefore converts the centering-positioning device into a reading-centering-positioning device, and includes means for mixing on its screen an image of the shape read off in this way from the spectacles frame rim or surround with the image imported from the patient wearing the spectacles frame.

The shape that is read being known perfectly and particularly precise, its configuration can advantageously serve as a reference system enabling, after adaptation and prior to centering and positioning, any correction necessary to take into account the inclination of the spectacles frame on the patient, for example.

Applying to a known shape, the corresponding processing is advantageously relatively simple, without demanding a sufficient level of contrast in the images and costly data processing resources.

In accordance with another preferred feature, the centering-positioning device of the invention can also be coupled, if required, to a numerically controlled grinding machine for machining the spectacles lenses to be fitted.

The invention advantageously avoids the taking of direct measurements from the patient for centering spectacles lenses and positioning a gripping member on them, and even for machining them, imports and processes images which, having diverse sources, are not necessarily to a uniform scale, if necessary memorizes a complete set of all the parameters to be taken into consideration and achieves all of the above using relatively simple data processing means.

BRIEF DESCRIPTION OF THE DRAWINGS

The features and advantages of the invention will become apparent from the following description given by way of example with reference to the accompanying diagrammatic drawings, in which:

FIGS. 4A, 4B are views analogous to those of

FIGS. 3A, 3B, 3C, 3D for a different embodiment.

FIGS. 5 and 6 are schematic embodiments in accordance with the invention.

DETAILED DESCRIPTION OF THE INVENTION

Figure 1:
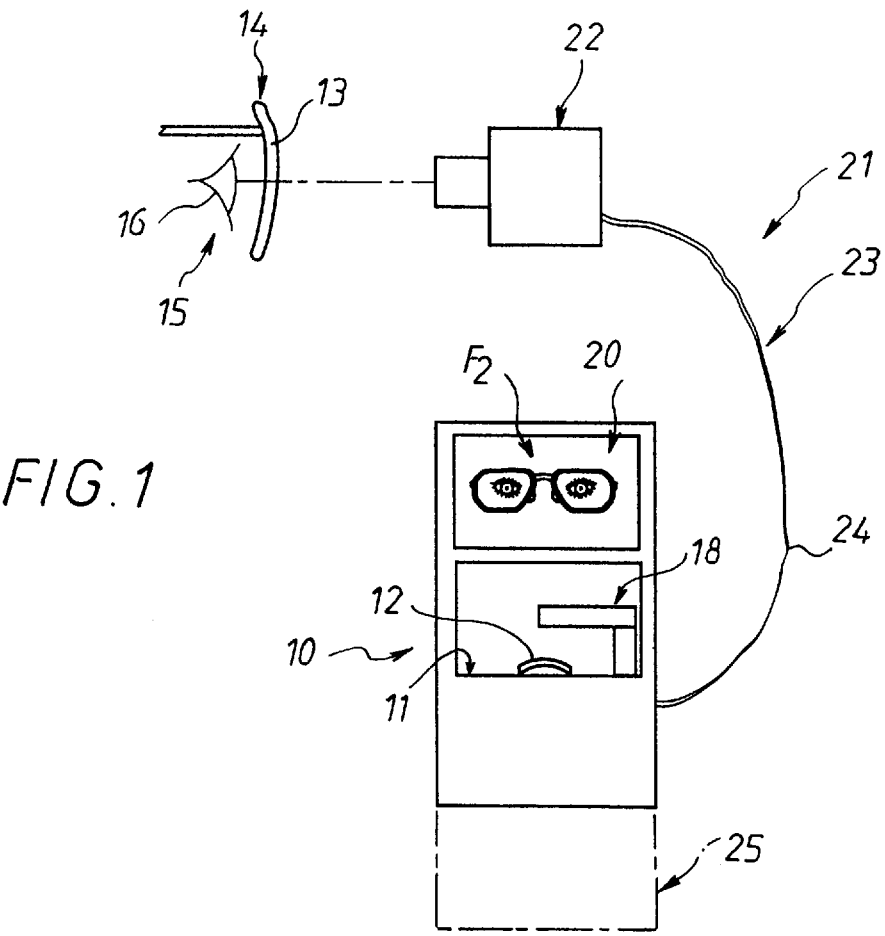
FIG. 1 is a block schematic of apparatus in accordance with the invention.

As shown in full outline in FIG. 1, the apparatus 10 of the invention includes a plate 11 for receiving a spectacles lens 12 to be fitted to one of the rims or surrounds 13 of a spectacles frame 14 chosen by a patient 15 schematically represented by one or both of their eyes 16, a positioning device 18 arranged above the plate 11 for positioning a gripping member, not shown, on the spectacles lens 12 and a screen 20 for displaying an image F1 of the spectacles lens 12 (FIG. 4B) and an image F2 of the rim or surround 13 of the spectacles frame 14 to which the lens is to be fitted.

The corresponding arrangements are well known in themselves and will not be described in more detail here.

In accordance with the invention, the apparatus 10 is combined with imaging means 21 so that the image F2 of the rim or surround 13 of the spectacles frame 14 to which the lens is to be fitted is an image imported from the patient 15 wearing this spectacles frame 14.

The imaging means 21 include an imaging device 22 and transmission means 23 operative between the imaging device 22 and the apparatus 10.

In the embodiment specifically shown in FIG. 1 the imaging device 22 is a video camera, for example a CCD camera.

It could equally well be a still camera or a camcorder, however.

In the embodiment specifically shown in FIG. 1, the transmission means 23 simply comprise a connecting cable 24 that connects the imaging device 22 directly to the apparatus 10.

As shown schematically in dashed outline in FIG. 1, the apparatus 10 is preferably coupled to a contour reading device 25 adapted to determine the shape of the bottom of the bezel of the rim or the surround 13 of the spectacles frame 14 to which the lens is to be fitted and includes means for mixing on its screen 20 an image F3 of the shape read off from the rim or surround 13 with the image F2 imported from the patient 15 wearing the spectacles frame 14.

The corresponding arrangements being well known in themselves, and evident to the skilled person, they will not be described here.

By virtue of arrangements that also do not need to be described in detail here, the apparatus 10 of the invention includes adjustment means for centering the image F3 of the shape read off from the rim or surround 13 of the spectacles frame 14 to which the lens is to be fitted on its screen 20 and adjustment means for enlarging this image F3 in two orthogonal directions.

Suffice to say, on this point, that the practitioner can use, in association with the screen 20, in addition to a selector button 26 enabling him to switch between the eyes 16 of the patient 15, two centering buttons 27H, 27V, one for horizontal displacement and the other for vertical displacement, two magnification buttons 28H, 28V, one for horizontal magnification and the other for vertical magnification, and a confirmation button 29.

Finally, by virtue of arrangements evident to the skilled person which will not be described here either, the apparatus 10 of the invention includes calculation means for deducing various corrections from a comparison of the image F3 of the shape read off from the rim or surround 13 of the spectacles frame 14 to which the lens is to be fitted and the image F2 imported from the patient 15 wearing the spectacles frame 14, and in particular corrections to allow for any inclination of the spectacles frame 14 on the patient 15, for consequential adjustment of the pupillary distance and the mounting height measured elsewhere.

A first way of using the apparatus 10 of the invention is as follows.

Figure 2:
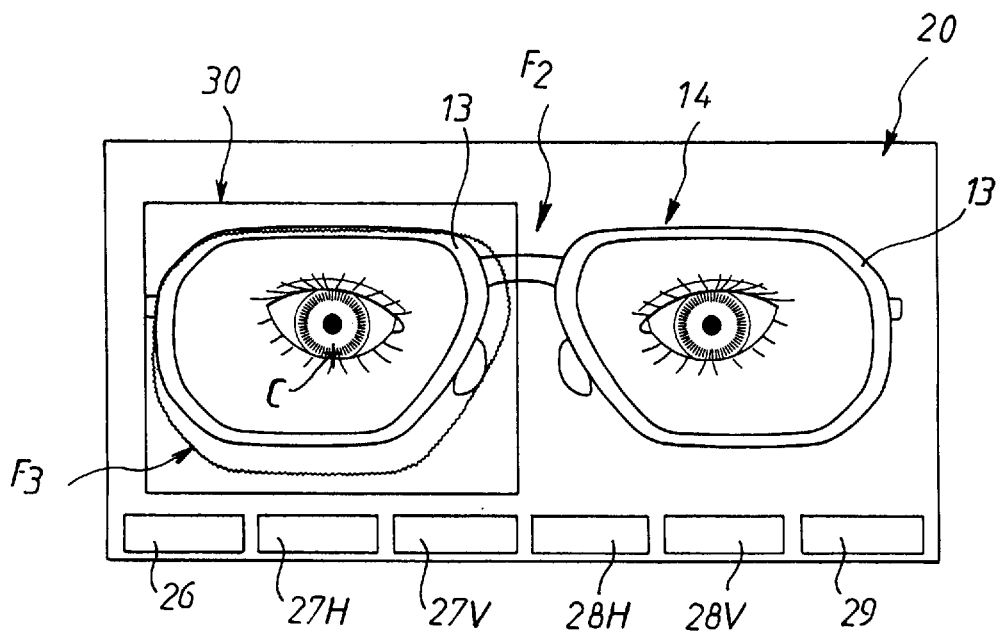
FIG. 2 is a view of its screen to a larger scale showing one phase of its use.

The image F2 of the patient 15 wearing the chosen spectacles frame 14 having been imported onto the screen 20, as shown in FIG. 2, the image F3 of the shape read of from one of the rims or surrounds 13 of this spectacles frame 14, in this instance the lefthand rim or surround 13, is conjointly displayed on the screen 20, as shown in FIG. 2.

In practise the image F3 is centered in an operating window 30.

Let C denote the geometrical center of the operating window 30, at the crossing point of its diagonals.

The geometric center C corresponds to the mechanical axis of the positioning device 18, i.e. to the axis commonly called the gripping member placement axis along which a gripping member is mechanically fitted to the spectacles lens 12 by the positioning device 18.

Figure 3A:
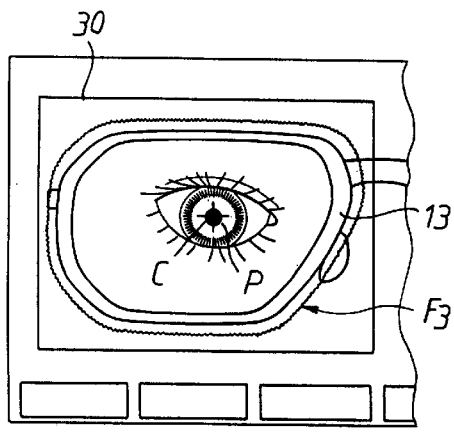
FIGS. 3A, 3B, 3C and 3D are other views of this screen showing other phases of its use.

As shown schematically in FIG. 3A, the practitioner first centers the image F3 and therefore the operating window 30 relative to the image of the patient 15.

In other words, by operating the centering buttons 27H, 27V, the geometric center C is caused to coincide with the pupil P of the patient 15.

By operating the magnification buttons 28H, 28V, the practitioner then approximately positions the image F3 of the shape read off within the rim or surround 13 of the image F2, as is effectively the case of the bezel of this rim or surround 13.

Figure 3B:
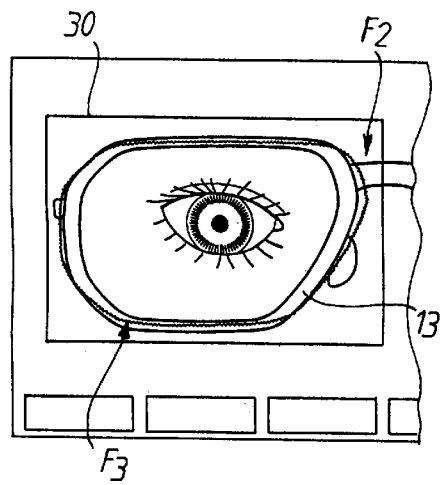
Figure 3C:
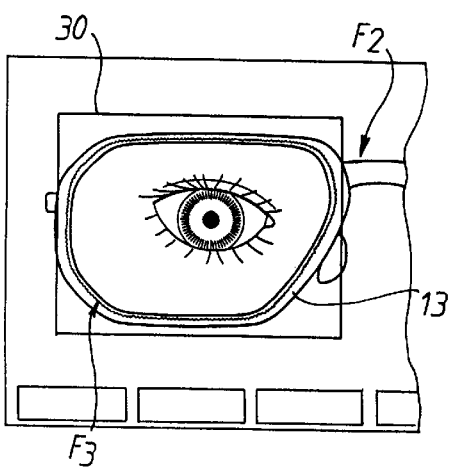

The practitioner operates the horizontal magnification button 28H (FIG. 3B) and then the vertical magnification button 28V (FIG. 3C), for example.

The opposite order of operation is of course entirely feasible.

In either case the operating window 30 is deformed accordingly.

By comparing the final shape of the operating window 30 and its original shape, the calculation means of the apparatus 10 of the invention determine the inclination to the vertical of the spectacles frame 14 on the patient 15.

They therefore enable the corrections to be applied to the values of the pupillary distance and the mounting height obtained from the image F2 to be determined.

In other words, they enable the corrections to be applied to the position of the pupil P relative to the geometric center C to be determined.

In determining these corrections, the image F3 of the shape read off is taken as a full scale reference system.

Figure 3D:
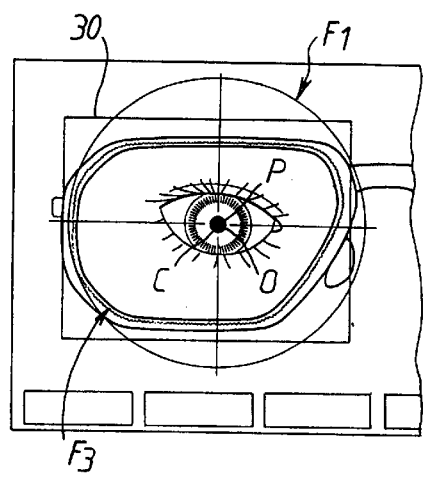

As shown schematically in FIG. 3D, the practitioner then displays the image F1 of the spectacles lens 12 on the screen 20, automatically achieving the necessary mixing.

The image F1 can be obtained by direct imaging of the spectacles lens 12.

It can equally well be a reticle suited to the scale of the imported image.

Be this as it may, the above corrections are taken into account in establishing this image F1 so that, instead of being circular in shape, it is a slightly deformed elliptical shape.

The practitioner usually positions the image F1 so that, as shown in FIG. 3D, the optical center O of the spectacles lens 12 also coincides with the pupil P of the patient 15 or with the reflection on the cornea that in practise represents the latter.

For this he can use the mark that usually represents an optical center O of this kind on a spectacles lens 12 or any other mark carried by the latter.

After checking visually that the diameter of the chosen spectacles lens 12 is sufficient, in which case its image F1 surrounds all points of the image F3 of the shape read off, the practitioner has only to axis the lens, i.e. to position it relative to the positioning device 18 so that its optical center O is on the gripping member placement axis of the latter, and then to position the gripping member on the spectacles lens 12 using the positioning device 18.

Of course, by virtue of arrangements that are known in themselves, it is equally possible to carry out this positioning along the gripping member placement axis of the positioning device 18 directly, without it being necessary to axis the lens previously.

In this case it is sufficient to allow for the resulting eccentricity of the gripping member relative to the optical center O of the spectacles lens 12 during grinding.

Figure 4A:
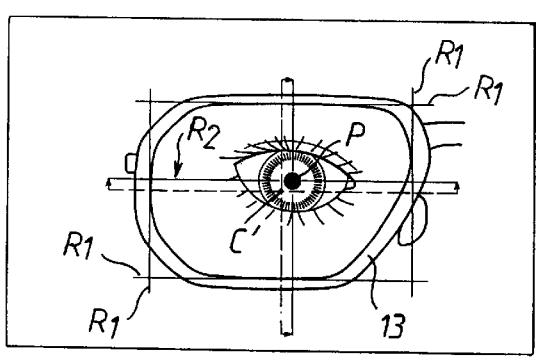
Figure 4B:
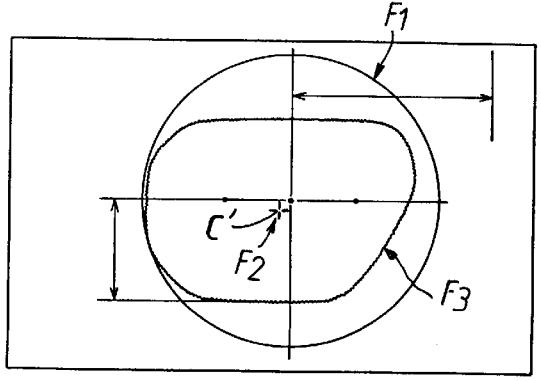

In a second embodiment, as shown schematically in FIG. 4A, the practitioner has four reticles R1 constituting orthogonal pairs enabling him to "box" the inside contour of the rim or surround 13 of the spectacles frame 14 to which the lens is to be fitted.

This leads to the determination of a geometrical center C' which can be indicated by a second reticle R2.

All that remains is for the practitioner to superpose this geometrical center C' on the pupil P, as previously (FIG. 4A).

The practitioner then displays the image F1 of the spectacles lens 12 and the image F3 of the shape read off, also as previously (FIG. 4D).

In the mix, the image F2 can be reduced to that of the geometrical center C' previously determined, as shown here.

A gripping member is then positioned, under the same conditions as previously.

In the embodiment shown in FIG. 5, the transmission means 23 operative between the imaging device 22 and the apparatus 10 include a processor unit 31 to which a monitor 32 is connected.

In the embodiment shown in FIG. 6 they include output means 33 controlled by the imaging device 22 and adapted to output a card 34 carrying the image obtained, possibly in an encoded form, and a card reader 35 adapted to read the card 34 and controlling the apparatus 10.

The output means 33 include a processor unit 31 to which a monitor 32 is connected, for example, as previously.

The card 34 produced is encoded in the form of a bar-code, for example.

In the embodiment shown the card 34 is conveyed from the output means 33 to the apparatus 10 in a bin 36 in which are also placed the spectacles frame 14 chosen by the patient 15 and the spectacles lenses 12 to be fitted to the spectacles frame 14.

Of course the present invention is not limited to the embodiments and uses described and shown, but encompasses any variant embodiment and/or use.

We claim:

1. Apparatus for centering a spectacles lens and positioning a gripping member thereon characterized in that it includes, in combination, a plate (11) for receiving a spectacles lens (12) to be fitted in one of the rims or surrounds (13) of a spectacles frame (14) chosen by a patient (15), a positioning device (18) arranged above the plate (11) for positioning a gripping member on the spectacles lens (12), and a screen (20) for displaying an image (F1) of the spectacles lens (12) and an image (F2) of the rim or surround (13) of the spectacles frame (14) to which the lens is to be fitted, and in that it is combined with imaging means (21) so that the image (F2) of the rim or surround (13) of the spectacles frame (14) to which the lens is to be fitted is an image imported from the patient (15) wearing the spectacles frame (14) concerned.

2. Apparatus according to claim 1 characterized in that the imaging means (21) include an imaging device (22) and transmission means (23) operative between them and the imaging device (22).

3. Apparatus according to claim 2 characterized in that the transmission means (23) comprise a connecting cable (24).

4. Apparatus according to claim 2 characterized in that the transmission means (23) include a processor unit (31) connected to a monitor (32).

5. Apparatus according to claim 2 characterized in that the transmission means (21) include output means (33) controlled by the imaging device (22) and adapted to produce a card (34) carrying the image produced, possibly in an encoded form, and a card reader (35).

6. Apparatus according to claim 1 characterized in that it is coupled to a contour reading device (25) adapted to read off the shape of the bottom of the bezel of the rim or surround (13) of the spectacles frame (14) to which the lens is to be fitted and includes means for mixing on its screen (20) an image (F3) of the shape read off in this way from the rim or surround (13) with the image (F2) imported from the patient (15) wearing the spectacles frame (14).

7. Apparatus according to claim 6 characterized in that it includes adjustment means for centering the image (F3) of the shape read off from the rim or surround (13) of the spectacles frame (14) to which the lens is to be fitted.

8. Apparatus according to claim 6 characterized in that it includes adjustment means for enlarging in two orthogonal directions the image (F3) of the shape read off from the rim or surround (13) of the spectacles frame (14) to which the lens is to be fitted.

9. Apparatus according claim 6 characterized in that it includes calculation means for deducing corrections for allowing for any inclination of the spectacles frame (14) from a comparison of the image (F3) of the shape read off from the rim or surround (13) of the spectacles frame (14) to which the lens is to be fitted and the image (F2) imported from the patient (15) wearing the spectacles frame (14).

* * * * *